United States Patent
Kwon et al.

(10) Patent No.: US 9,172,415 B2
(45) Date of Patent: Oct. 27, 2015

(54) METHOD AND APPARATUS FOR ADAPTIVELY SETTING THRESHOLD FOR SIGNAL DEMODULATION

(71) Applicant: Samsung Electronics Co., Ltd., Suwon-si (KR)

(72) Inventors: Ui Kun Kwon, Hwaseong-si (KR); Chang Soon Park, Chungju-si (KR); Chi Sung Bae, Yongin-si (KR); Joon Seong Kang, Suwon-si (KR); Sang Joon Kim, Hwaseong-si (KR); Seung Keun Yoon, Seoul (KR); Chang Mok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/200,867

(22) Filed: Mar. 7, 2014

(65) Prior Publication Data

US 2015/0036768 A1    Feb. 5, 2015

(30) Foreign Application Priority Data

Aug. 1, 2013  (KR) .................. 10-2013-0091381

(51) Int. Cl.
  *H04L 25/06* (2006.01)
  *H04L 25/10* (2006.01)
  *H04B 1/12* (2006.01)
(52) U.S. Cl.
  CPC .................... *H04B 1/123* (2013.01)

(58) Field of Classification Search
  CPC .......................................... H04B 1/123
  USPC ........................ 375/324, 316–317
  See application file for complete search history.

(56) References Cited

U.S. PATENT DOCUMENTS

| | | | |
|---|---|---|---|
| 6,173,018 B1 | 1/2001 | Kuroki | |
| 7,233,630 B2 * | 6/2007 | Murakami et al. | 375/316 |
| 7,418,064 B2 * | 8/2008 | Wei et al. | 375/340 |
| 2002/0085649 A1 | 7/2002 | Hwang | |
| 2002/0122504 A1 | 9/2002 | Payne et al. | |
| 2002/0160738 A1 | 10/2002 | Allott et al. | |
| 2003/0139165 A1 | 7/2003 | Smith et al. | |
| 2006/0079196 A1 | 4/2006 | Atsumi | |
| 2007/0153938 A1 * | 7/2007 | Van Der Tuijn et al. | 375/317 |
| 2007/0195444 A1 | 8/2007 | Annampedu | |
| 2007/0291879 A1 | 12/2007 | Yamazaki et al. | |
| 2009/0247100 A1 | 10/2009 | Meltzer et al. | |
| 2012/0147763 A1 | 6/2012 | Lee et al. | |
| 2013/0223552 A1 * | 8/2013 | Okada | 375/267 |
| 2015/0036768 A1 * | 2/2015 | Kwon et al. | 375/317 |

* cited by examiner

*Primary Examiner* — Qutbuddin Ghulamali
(74) *Attorney, Agent, or Firm* — NSIP Law (57) ABSTRACT

Provided is a method and apparatus to adaptively set a threshold for signal demodulation. The apparatus and the method include adaptively setting a threshold to demodulate a currently received symbol based on the demodulation value of a previously received symbol based on a comparison value. The comparison value is obtained by comparing a number of previously received symbols having a demodulation value of "0" and a number of currently received symbols having a demodulation value of "1".

21 Claims, 9 Drawing Sheets

| DATA DETECTION($\hat{d}_n$) | METRIC |
|---|---|
| 0 | $B_n <$ thr |
| 1 | $B_n <$ thr |

METHOD AND APPARATUS FOR ADAPTIVELY SETTING THRESHOLD FOR SIGNAL DEMODULATION

CROSS-REFERENCE TO RELATED APPLICATION

This application claims the benefit under 35 U.S.C. §119(a) of Korean Patent Application No. 10-2013-0091381, filed on Aug. 1, 2013, in the Korean Intellectual Property Office, the entire disclosure of which is incorporated herein by reference for all purposes.

BACKGROUND

1. Field

The following description relates to a method and apparatus to adaptively set a threshold for signal demodulation.

2. Description of Related Art

A sensor network is rapidly becoming widespread based on fast improvement and commercialization of wireless network technology. Wireless network technology standardization is being actively conducted by the Institute of Electrical and Electronics Engineers (IEEE) through, for example, IEEE 802.15.4, which is a standard that specifies a physical layer and media access control for low-rate wireless personal area networks (LR-WPANs). In particular, standardization of Bluetooth and ZigBee is also being performed.

A wireless sensor device may be applied to various fields, for example, home security, medicine, mobile healthcare, chemical and biological defect monitoring, breakdown and damage diagnosis for machinery, environmental monitoring, sensing information associated with natural disasters, intelligent logistics management, real-time security, and remote observation.

Various wireless sensor networks and local area networks (LANs) require compact-sized sensors. Also, for a durable operation of a number of sensors, it is advantageous for wireless sensors to consume less power and have low complexity requirements.

In particular, in a wireless body area network (WBAN), a sensor to be attached to a human body needs to have low power and low complexity requirements. When attached to a human body, the sensor communicates wirelessly with an adjacent mobile device or a sensor of another human body.

Recently, to improve a performance of a super-low power analog circuit, research on stable demodulation of a received signal has increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with one configuration, there is provided a method, including identifying a demodulation value of a previously received symbol received during a predetermined symbol period; and adaptively setting a threshold to demodulate a currently received symbol based on the demodulation value of the previously received symbol.

The identifying may include obtaining a comparison value by comparing a number of previously received symbols having a demodulation value of "0" and a number of currently received symbols having a demodulation value of "1".

The obtaining may include setting a weighted value based on a distance between the currently received symbol and the previously received symbol; and comparing the number of previously received symbols having the demodulation value of "0" and the number of currently received symbols having the demodulation value of "1" using the weighted value.

The method may also include alternately receiving a training symbol having a demodulation value of "0" and a training symbol having a demodulation value of "1" during a predetermined training period.

The adaptively setting may include setting a fixed threshold using the training symbol having the demodulation value of "0" and the training symbol having the demodulation value of "1"; and setting the fixed threshold to be an initial value of the threshold for demodulating the currently received symbol.

The adaptively setting may include identifying an amplitude difference between the training symbol having the demodulation value of "0" and the training symbol having the demodulation value of "1"; and setting, using the amplitude difference, a range in which the threshold to demodulate the currently received symbol is to be changed.

The adaptively setting may include determining, based on the comparison value, an amount by which the threshold for demodulating the currently received symbol is to be changed.

The identifying may include calculating, using an exponential function based on the comparison value, the amount by which the threshold to demodulate the currently received symbol is to be changed.

The calculating may include calculating, by applying a Taylor series to the exponential function based on the comparison value, the amount by which the threshold to demodulate the currently received symbol is to be changed.

In accordance with another illustrative configuration, there is provided an apparatus, including a demodulation value identifier configured to identify a demodulation value of a previously received symbol received during a predetermined symbol period; and a threshold setting unit configured to adaptively set a threshold to demodulate a currently received symbol based on the demodulation value of the previously received symbol.

The apparatus may also include a buffer configured to store the previously received symbol and the currently received symbol, wherein the demodulation value identifier and the threshold setting unit receive the previously received symbol and the currently received symbol.

The demodulation value identifier may include a comparison value obtainer configured to obtain a comparison value by comparing a number of the previously received symbols having a demodulation value of "0" and a number of the currently received symbols having a demodulation value of "1".

The comparison value obtainer may include a weighted value setting unit configured to set a weighted value based on a distance between the currently received symbol and the previously received symbol; and a symbol number comparator configured to compare the number of previously received symbols having the demodulation value of "0" and the number of currently received symbols having the demodulation value of "1" using the weighted value.

The apparatus may also include a training symbol receiver configured to alternately receive a training symbol having a demodulation value of "0" and a training symbol having a demodulation value of "1" during a predetermined training period.

The threshold setting unit may also include a fixed threshold setting unit configured to set a fixed threshold using the training symbol having the demodulation value of "0" and the training symbol having the demodulation value of "1"; and an initial value setting unit configured to set the fixed threshold to be an initial value of the threshold to demodulate the currently received symbol.

The threshold setting unit may include an amplitude difference identifier configured to identify an amplitude difference between the training symbol having the demodulation value of "0" and the training symbol having the demodulation value of "1"; and a range setting unit configured to set, using the amplitude difference, a range in which the threshold to demodulate the currently received symbol is to be changed.

The threshold setting unit may include an amount determiner configured to determine, based on the comparison value, an amount by which the threshold to demodulate the currently received symbol is to be changed.

In accordance with a configuration, there is provided method, including calculating, prior to demodulating a currently received signal, an amount of threshold to be changed based on at least one of a demodulation value of "0" and a demodulation value of "1" among demodulation signals occurring in a predetermined period; and demodulating the currently received signal based on the calculated amount of threshold to be changed.

The calculating may include obtaining a comparison value by comparing a number of previously received signals having the demodulation value of "0" and a number of currently received signals having the demodulation value of "1".

The calculating may include calculating, using an exponential function based on the comparison value, the amount by which the threshold to demodulate a currently received signal is to be changed.

The calculating, using the exponential function, may include calculating, by applying a Taylor series to the exponential function based on the comparison value, the amount by which the threshold to demodulate the currently received signal is to be changed.

Other features and aspects may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

There is a need for sensor devices to be installed in a wireless sensor network and a local area network (LAN) to be designed in a compact size, and a low power and low complexity structure.

In general, a superheterodyne radio frequency (RF) structured receiver may use an intermediate frequency band to improve performance, for example, sensitivity, rather than converting a received signal from a high-frequency band directly to a base band. However, complexity, costs, and power consumption may increase.

In an RF portion, a modem technology based on a superheterodyne RF structure scheme requires a greater amount of power when compared to a digital base band portion. For example, in a case of a modem chip for a low power wireless personal area network (WPAN), a digital signal processing portion may use approximately 0.5 milliwatts (mW) of power for transmission and reception, whereas an analog signal processing portion may use power of approximately 21 mW in a reception mode and 30 mW in a transmission mode.

Accordingly, research on reducing power consumption of communication modems is being actively conducted using various low power RF structured receiver. In particular, a receiver structure using a super-regenerative receiver is designed to amplify an output signal and detect a signal using a positive feedback structure. Because a simple RF structured receiver using a relatively fewer number of active devices is adopted, the RF structured receiver attracts a lot of attention as an ultra low power receiver.

Although a short distance transmitting and receiving system adopting the low power and low complexity RF structured receiver significantly reduces power consumption, performance degradation of the analog signal processing portion may cause overall performance degradation in the system.

The super-regenerative receiver may experience performance degradation in a system due to a low selectivity characteristic of a frequency response.

Figure 1:
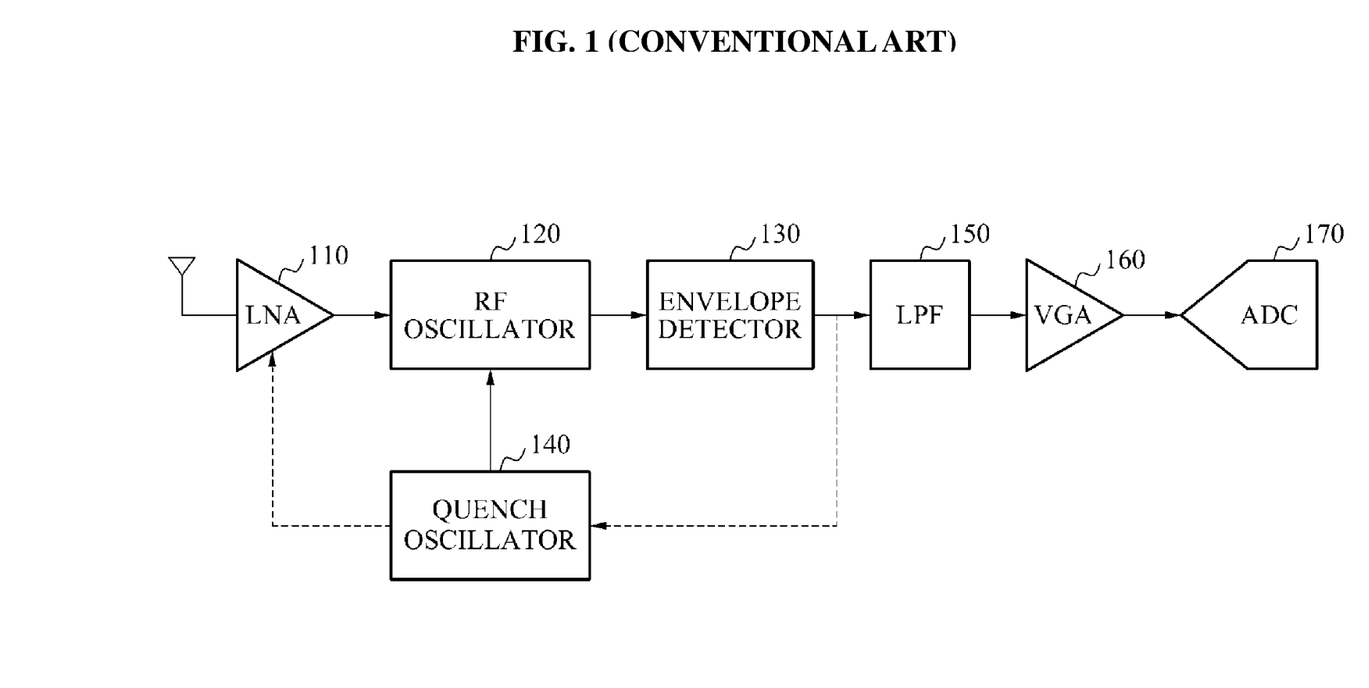
FIG. 1 illustrates an example of a conventional super-regenerative receiver.

FIG. 1 illustrates an example of a conventional super-regenerative receiver.

Referring to FIG. 1, an RF signal passes through a low noise amplifier (LNA) 110 and subsequently an RF oscillator 120. In this instance, the RF oscillator 120 may be, for example, a super-regenerative oscillator (SRO). The RF oscillator 120 amplifies the RF signal corresponding to a predetermined frequency using a positive feedback loop. As the amplification continues, an oscillation may occur. Thus, a configuration to stop the oscillation is required. A quench oscillator 140 may control periodical generation and terminate the oscillation. For example, in a case in which an on-off keying (OOK) modulation scheme is used, when a transmitting end transmits a signal corresponding to a transmission symbol "1", the RF oscillator 120 may generate a relatively strong oscillation signal controlled by the quench oscillator 140.

When the transmitting end transmits a signal corresponding to a transmission symbol "0", the RF oscillator 120 may generate, in practice, a weak oscillation signal due to noise, although ideal oscillation is absent.

Figure 2:
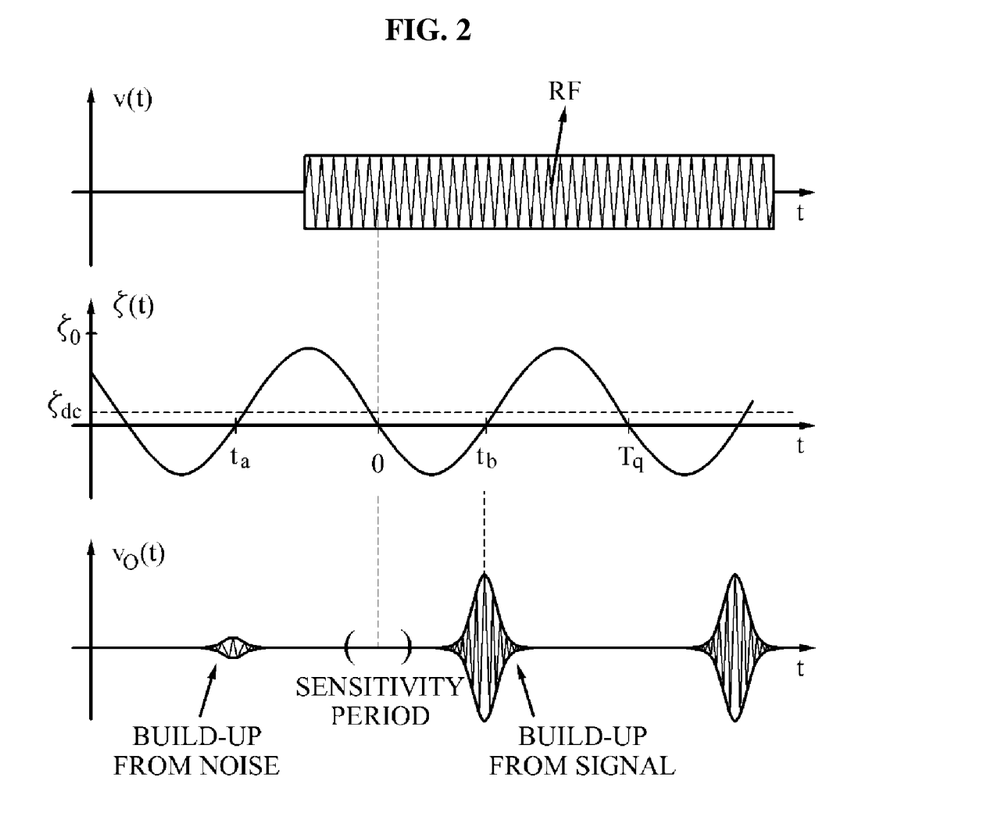
FIG. 2 illustrates an example of an input signal, a damping function, and an output signal of a super-regenerative receiver, in accordance with an embodiment.

An RF signal input to the RF oscillator 120, an output signal, and a damping function of a closed-loop system using the positive feedback loop is illustrated in FIG. 2.

An envelope detector 130 detects an envelope from the output signal of the RF oscillator 120. A low-pass filter (LPF) 150 filters a predetermined area in the detected envelope.

In this example, the output signal may require a high-magnitude of amplification for detection in a digital base band because an output signal of the envelope detector 130 may be a weak signal. Also, controlling a magnitude of amplification as a function of a distance between a transmitter and a receiver may be necessary in the envelope detected from the output signal at the envelope detector 130. Thus, the envelope detected from the output signal at the envelope detector 130 passes through a variable gain amplifier (VGA) 160, which is configured to amplify a signal by controlling a magnitude of amplification.

In this instance, the VGA 160 amplifies a received signal from the LPF 150 to have an intensity of at least 40 decibels (dB). When the envelope detected from the output signal at the envelope detector 130 includes a direct current (DC) offset component, a signal over-amplified due to the DC offset component may saturate an entire circuit.

In particular, when an OOK demodulation signal passes through the envelope detector 130, the envelope detected from the output signal always having a positive value may be obtained.

The signal amplified by the VGA 160 may pass through an analog-to-digital converter (ADC) 170, and be provided to a physical layer (PHY) (not shown).

FIG. 2 illustrates an example of an input signal, a damping function, and an output signal of a super-regenerative receiver, in accord with an embodiment.

Referring to FIG. 2, in response to an RF signal v(t) input to an SRO, an output signal $v_o(t)$ of the SRO is provided in a form of an RF pulse series in which oscillation and attenuation are periodically repeated for each quench period $T_q$.

Here, $\zeta(t)$ refers to a damping function of a closed-loop system $\zeta(t)$ varies in response to a signal of a quench oscillator. When a value of $\zeta(t)$ changes from a positive value to a negative value, an SRO output signal may initiate oscillation, and an unstable interval may start, in which an amplitude value gradually increases. The unstable interval may continue until the value of $\zeta(t)$ changes from a negative value to a positive value. When the amplitude value reaches a maximum value, a stable interval may begin, in which the amplitude value attenuates.

An RF pulse occurring in an SRO output during a single quench period may reoccur during a subsequent quench period. The RF pulse occurring in the SRO output may overlap another RF pulse newly generated during the subsequent quench period, and cause an occurrence of intersymbol interference (ISI). In one example, the occurrence of the ISI is referred to as a hangover effect. To eliminate the hangover effect, $\zeta(t)$ may have a value of $\zeta_{dc}$ corresponding to a DC component value.

As the amplitude value of the RF input signal v(t) increases, the amplitude value of the SRO output $v_o(t)$ may also increase.

A regenerative gain is a main factor in determining the amplitude value of the SRO output $v_o(t)$. The regenerative gain may be determined based on integral values of a sensitive curve and a normalized envelope of the RF signal input to the SRO.

Referring to the following equations, when the RF input signal of the SRO corresponds to $v(t)=Vp_c(t)\cos(\omega_0 t+\phi)$, the SRO output $v_o(t)$ may be calculated as follows.

$$v_o(t)=VK_0K_gK_rp(t)\cos(\omega_0 t+\phi)$$

$$K_r=\zeta_0\omega_0\int_{t_a}^{t_b}p_c(\tau)s(\tau)d\tau$$

$$s(t)=\exp(\omega_0\int_0^t\zeta(\lambda)d\lambda)$$

$$p(t)=\exp(-\omega_0\int_{t_b}^t\zeta(\lambda)d\lambda)$$

In one example, $p_c(t)$ denotes a pulse envelope of which a maximum value is normalized to "1". $K_r$ denotes the regenerative gain, s(t) denotes the sensitivity curve, and p(t) denotes the normalized envelope of the SRO output.

An amplitude of the SRO output is determined based on a value of V corresponding to a peak amplitude of the RF input signal, and integral values of s(t) and $p_c(t)$.

An increase of the peak amplitude of the RF input signal may cause an increase of the peak amplitude of the SRO output, and the peak amplitude of the SRO output may be also determined based on an amount of input energy captured based on an overlap level of s(t) and $p_c(t)$.

Figure 3:
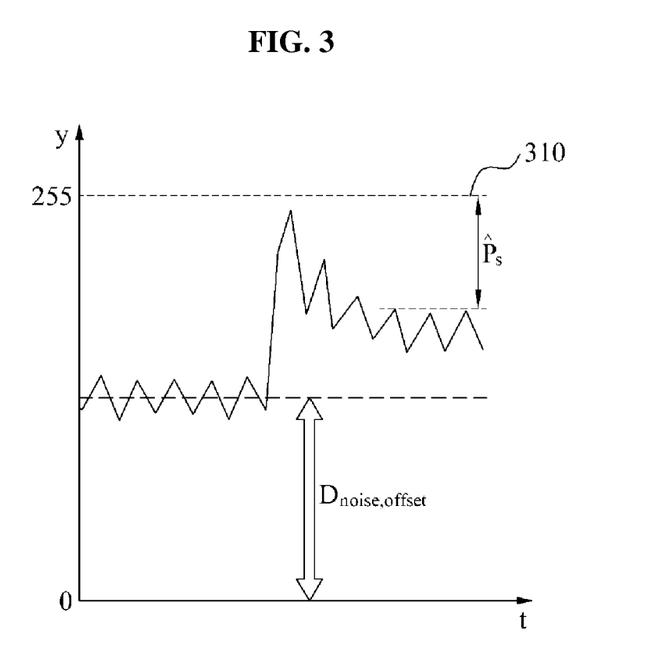
FIG. 3 illustrates an example of an analog-to-digital converter (ADC) output waveform with respect to a received signal of a super-regenerative receiver, in accordance with an embodiment.

FIG. 3 illustrates an example of an output waveform of an ADC with respect to a received signal of a super-regenerative receiver, in accord with an embodiment.

Referring to FIG. 3, when the super-regenerative receiver receives a predetermined transmission signal modulated using an OOK, the ADC may obtain an output waveform with a dynamic range from "0" to "255", using 8-bit of resolution bit.

In one example, the output signal of an envelope detector always has a positive value. Thus, a VGA may be designed to have a frequency response characteristic to eliminate or restrict a low frequency component to eliminate a DC offset component and maintain a low power.

Accordingly, an output signal of the VGA may have an average value of "0" and a waveform alternating between a positive value and a negative value centered around the average value of "0" may be provided.

Due to a characteristic of mitigating a DC offset, when an identical signal selected from transmission symbols "0" and "1" is alternately received, an output signal of the ADC may not maintain an amplitude of a predetermined transmission signal and may have a tendency 310 to approach an average value, for example, zero volts. In one example, the zero volts may be an ADC of level 128.

In terms of a long time period, the DC offset component may be eliminated. However, a DC fluctuation effect, in which a DC offset value changes based on a time during a time period on a signal-by-signal basis, may occur depending on whether a predetermined transmission signal occurs alternately.

In a case of an OOK modulation and demodulation scheme, setting a threshold for determining whether a signal is present may have a strong influence on a bit error rate performance.

Accordingly, mitigating a DC offset may distort the output signal of the ADC, for example, an input value of a digital base band and; thus, cause performance degradation in the bit error rate.

Figure 4A:
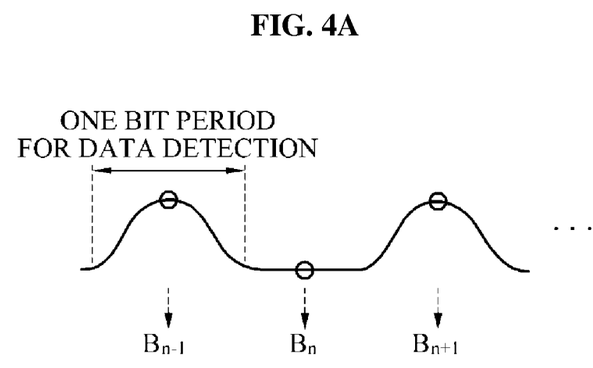
FIGS. 4A and 4B illustrate an example of a received symbol demodulation scheme, in accordance with an embodiment.
Figure 4B:
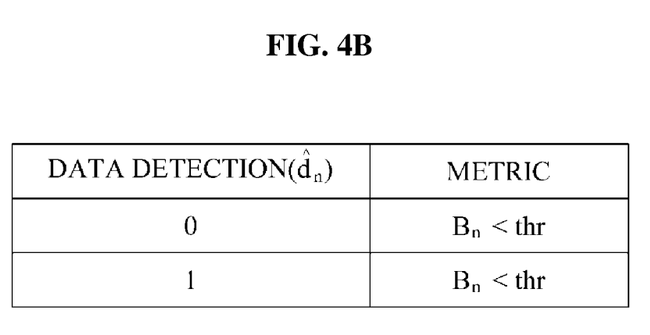

FIGS. 4A and 4B illustrate an example of a received symbol demodulation scheme, in accord with an embodiment.

Referring to FIGS. 4A and 4B, a super-regenerative receiver receives a symbol and demodulates the received symbol. As illustrated in FIG. 4A, the super-regenerative receiver receives a single symbol during one bit period and demodulates the received symbol using a threshold. For example, when the super-regenerative receiver alternately receives a symbol having a symbol value of "0" and a symbol having a symbol value of "1", the super-regenerative receiver may set the threshold to be an intermediate value between "0" and "1".

FIG. 4B illustrates a scheme to determine a demodulation value of a received symbol by comparing the received symbol and the threshold. When the received symbol is less than the threshold, for example, $B_n$<thr, a demodulation value $\hat{d}_n$ may be determined to be "0". When the received symbol is greater than the threshold, for example, $B_n$>thr, the demodulation value $\hat{d}_n$ may be determined to be "1".

Figure 5:
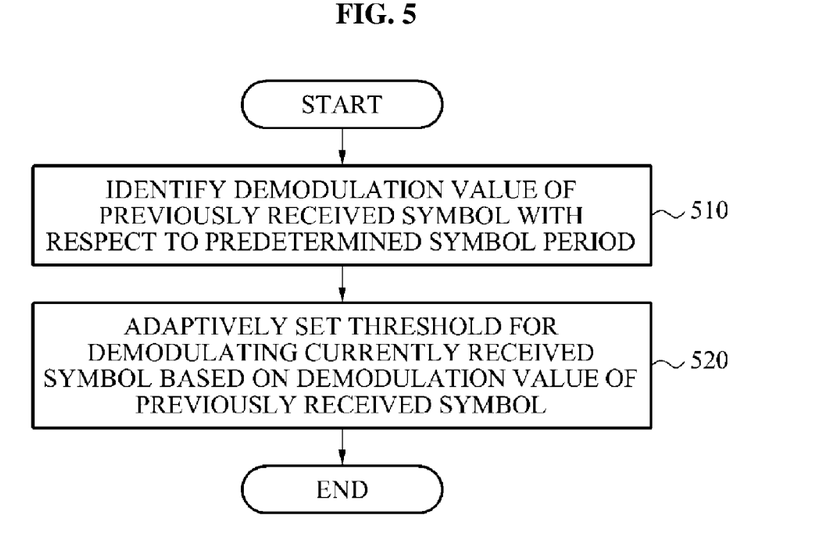
FIG. 5 illustrates an example of a method to adaptively set a threshold, in accordance with an embodiment.

FIG. 5 illustrates an example of a method of adaptively setting a threshold, in accord with an embodiment.

Referring to FIG. 5, in operation 510, the method identifies a demodulation value of a previously received symbol received during a predetermined symbol period. In one example, the previously received symbol is a symbol received prior to a currently received symbol. The predetermined symbol period indicates a period of time in which the previously received symbol is received. A length of the predetermined symbol period may vary based on a system of the super-regenerative receiver.

In operation 510, the method also compares a number of previously received symbols having a demodulation value of "0" with a number of previously received symbols having a demodulation value of "1". A comparison value may be obtained based on a result of the comparing. For example, when the length of the predetermined symbol period is "8", the number of previously received symbols having the demodulation value of "0" is "3", and the number of previously received symbols having the demodulation value of "1" is "5", the comparison value may be "2".

Due to an AC coupling effect, a DC fluctuation effect may vary based on a distance between the currently received symbol and the previously received symbol. For example, a DC fluctuation effect in a case in which two previously received symbols correspond to (1,0) may differ from a DC fluctuation effect in a case in which two previously received symbols correspond to (0,1).

To reflect the DC fluctuation effect, the comparison value may be set in operation 510, using a weighted value. As an example, in operation 510, the weighted value may be set based on a distance between the currently received symbol and the previously received symbol. Also, in operation 510, the number of previously received symbols having the demodulation value of "0" may be compared to the previously received symbols having the demodulation value of "1", and the comparison value may be set based on a result of the comparing.

The comparison value may be expressed as an equation of $$\sum_{i=1}^{M} (2 \times \hat{d}_{n-i} - 1).$$

In one example, M denotes the length of the predetermined symbol period, and $\hat{d}_{n-i}$ denotes a demodulation value of $(n-i)^{th}$ symbol having a value of "0" of "1". Using an equation of $2\times\hat{d}_{n-i}-1$, the previously received symbol having the demodulation value of "0" may be expressed as "−1", and the previously received symbol having the demodulation value of "1" may be expressed as "1". Accordingly, the comparison value obtained by comparing the number of previously received symbols having the demodulation value of "0" and the number of previously received symbols having the demodulation value of "1" may be expressed as equation $$\sum_{i=1}^{M} (2 \times \hat{d}_{n-i} - 1).$$

For example, the comparison value of "3" may indicate that the number of previously received symbols having the demodulation value of "1" is greater than the number of previously received symbols having the demodulation value of "0" by "3". The comparison value of "−2" may indicate that the number of previously received symbols having the demodulation value of "0" is greater than the number of previously received symbols having the demodulation value of "1" by "2".

When the weighted value based on the distance between the currently received symbol and the previously received symbol is applied to the comparison value, the comparison value is expressed by the following equation $$\sum_{i=1}^{M} w_i \cdot (2 \times \hat{d}_{n-i} - 1).$$

In one example, $W_i$ is a weighted value of $i^{th}$ symbol. For example, five previously received symbols correspond to (0, 0, 1, 1, 1), the comparison value without applying the weighted value is "1". However, when the weighted values based on the distance between the currently received symbol and the previously received symbol correspond to (0.6, 0.7, 0.8, 0.9, 1), the comparison value applied the weighted value may be "1.4".

In operation 520, the method adaptively sets the threshold for demodulating the currently received symbol based on the demodulation value of the previously received symbol.

As described above, when the symbol having the demodulation value of "1" or the symbol having the demodulation value of "0" is continuously received, an output signal of the ADC may not maintain an amplitude in the symbol and may tend to maintain an average value. Thus, to obtain an optimized performance, the threshold to demodulate the currently received symbol may identically vary as the varying output signal of the ADC. Accordingly, in operation 520, the method adaptively sets the threshold by obtaining a range in which the threshold is to be changed, an amount by which the threshold is to be changed, and an initial value of the threshold.

To set the range and the initial value of the threshold, a training symbol having a demodulation value of "0" and a training symbol having a demodulation value of "1" may be alternately received during a predetermined training period. When the training symbol having the demodulation value of "0" and the training symbol having the demodulation value of "1" are alternately received during the predetermined training period, probability distribution of the training symbol having the demodulation value of "0" may be identical to probability distribution of the training symbol having the demodulation value of "1". Accordingly, a fixed threshold may be set to be an intermediate value between "0" and "1". Because the fixed threshold is set to be the intermediate value between "0" and "1", the amount by which the threshold to demodulate the currently received symbol is to be changed, which will be described hereinafter, is based on the comparison value obtained by comparing the number of previously received symbols having the demodulation value of "0" to the number of previously received symbols having the demodulation value of "1". Because the fixed threshold may be set to be another value, an amount by which the threshold for demodulating the currently received symbol is to be changed may be based on another parameter, in lieu of the comparison value. For example, when the fixed threshold is set to be the other value in lieu of the intermediate value between "0" and "1", the range in which the threshold to demodulate the currently received symbol is to be changed is based on the number of previously received symbols having the demodulation value of "0" and the number of previously received symbols having the demodulation value of "1".

The fixed threshold is set to be the initial value of the threshold to demodulate the currently received symbol, and the threshold for demodulating the currently received symbol may vary based on the initial value.

In operation 520, the method identifies an amplitude difference between the training symbol having the demodulation value of "0" and the training symbol having the demodulation value of "1" during the predetermined training period. The range in which the threshold to demodulate the currently received symbol is to be changed is set using the identified amplitude difference. The range in which the threshold for demodulating the currently received threshold is to be changed may vary based on characteristics of a system. For example, when the probability distribution of the training symbol has the demodulation value of "0" and is identical to the probability distribution of the training symbol having the demodulation value of "1", the amplitude difference between the probability distribution of the training symbol having the demodulation value of "0" and the probability distribution of the training symbol having the demodulation value of "1" are identified using sig_pwr and the range in which the threshold for demodulating the currently received symbol is to be changed is set as $$\frac{\text{sig\_pwr}}{2}.$$

Thus, the range in which the threshold to demodulate the currently received symbol is changed may be limited by $$\frac{\text{sig\_pwr}}{2}.$$

In operation 520, the method determines the amount by which the threshold for demodulating the currently received symbol is to be changed based on the comparison value. The method changes the amount by which the threshold to demodulate the currently received symbol based on a magnitude of the comparison value and whether the comparison value is a positive value or a negative value.

In particular, the method calculates the amount by which the threshold to demodulate the currently received symbol is to be changed using an exponential function based on the comparison value. The threshold for demodulating the currently received symbol may be expressed as Equation 1.

$$\text{If } \sum_{i=1}^{M} (2 \times \hat{d}_{n-i} - 1) > 0 \quad \text{[Equation 1]}$$

$$\text{thr\_amt}_n =$$

$$\text{thr\_fix} + \frac{\text{sig\_pwr}}{2} \times \left( e^{-\tau_c \times \left( \sum_{i=1}^{M} (2 \times \hat{d}_{n-i} - 1) \right)} - 1 \right)$$

else, $$\text{thr\_amt}_n = \text{thr\_fix} + \frac{\text{sig\_pwr}}{2} \times \left( 1 - e^{\tau_c \times \left( \sum_{i=1}^{M} (2 \times \hat{d}_{n-i} - 1) \right)} \right)$$

In one example, $\text{thr\_amt}_n$ denotes a threshold to demodulate $n^{th}$ received symbol and thr_fix denotes a fixed threshold.

$$\frac{\text{sig\_pwr}}{2}$$

denotes half of the amplitude difference between the training symbol having the demodulation value of "0" and the training symbol having the demodulation value of "1", and indicates the range in which the threshold to demodulate the currently received symbol is to be changed. $\tau_c$ corresponds to a time constant used to control the amount by which the threshold to demodulate the currently received symbol is to be changed. $\tau_c$ varies based on a system of a super-regenerative receiver $$\sum_{i=1}^{M} (2 \times \hat{d}_{n-i} - 1)$$

denotes the comparison value.

When the comparison value is greater than "0", or when the number of currently received symbols having the demodulation value of "1" is greater than the number of currently received symbols having the demodulation value of "0", the threshold to demodulate the currently received symbol varies based on $$\text{thr\_fix} + \frac{\text{sig\_pwr}}{2} \times \left( e^{-\tau_c \times \left( \sum_{i=1}^{M} (2 \times \hat{d}_{n-i} - 1) \right)} - 1 \right).$$

The threshold to demodulate the currently received symbol varies, based on $$\left( e^{-\tau_c \times \left( \sum_{i=1}^{M} (2 \times \hat{d}_{n-i} - 1) \right)} - 1 \right),$$

using the fixed threshold as the initial value and $$\frac{\text{sig\_pwr}}{2}$$

as the range in which the threshold is to be changed. As the comparison value increases, the threshold to demodulate the currently received symbol converges on a difference value between thr_fix and $$\frac{\text{sig\_pwr}}{2}.$$

When the comparison value is less than "0", or when the number of previously received symbols having the demodulation value of "0" is greater than previously received symbols having the demodulation value of "1", the threshold to demodulate the currently received symbol varies based on $$\text{thr\_fix} + \frac{\text{sig\_pwr}}{2} \times \left(1 - e^{\tau_c \times \left(\sum_{i=1}^{M}(2 \times \hat{d}_{n-i} - 1)\right)}\right).$$

As the comparison value decreases, or as the number of previously received symbols having the demodulation value of "0" becomes greater than previously received symbols having the demodulation value of "1", the threshold to demodulate the currently received symbol converges on a sum of thr_fix and $$\frac{\text{sig\_pwr}}{2}.$$

In addition, when the weighted value based on a distance between the currently received symbol and the previously received symbol is applied to the comparison value, the threshold to demodulate the currently received symbol is expressed as Equation 2.

$$\text{If } \sum_{i=1}^{M}(2 \times \hat{d}_{n-i} - 1) > 0 \quad \text{[Equation 2]}$$

$$\text{thr\_amt}_n =$$
$$\text{thr\_fix} + \frac{\text{sig\_pwr}}{2} \times \left(e^{-\tau_c \times \left(\sum_{i=1}^{M} w_i(2 \times \hat{d}_{n-i} - 1)\right)} - 1\right)$$

else, $$\text{thr\_amt}_n = \text{thr\_fix} + \frac{\text{sig\_pwr}}{2} \times \left(1 - e^{\tau_c \times \left(\sum_{i=1}^{M} w_i(2 \times \hat{d}_{n-i} - 1)\right)}\right)$$

In one example, $W_i$ denotes a weighted value of an $i^{th}$ symbol. As described in Equation 2, when the weighted value based on the distance between the currently received symbol and the previously received symbol is applied to the comparison value, the DC fluctuation effect may be more accurately reflected.

As described in Equation 3 and Equation 4 below, the amount by which the threshold to demodulate the currently received symbol is to be changed may be approximately expressed by applying a first order Taylor series to an exponential function based on the comparison value. In an example, Equation 4 illustrates a case in which the weighted value based on the distance between the currently received symbol and the previously received symbol is applied to the comparison value.

$$\text{thr\_amt}_n \approx \text{thr\_fix} + \frac{\text{sig\_pwr}}{2} \times \left(-\tau_c \times \left(\sum_{i=1}^{M}(2 \times \hat{d}_{n-i} - 1)\right)\right) \quad \text{[Equation 3]}$$

$$\text{thr\_amt}_n \approx \quad \text{[Equation 4]}$$
$$\text{thr\_fix} + \frac{\text{sig\_pwr}}{2} \times \left(-\tau_c \times \left(\sum_{i=1}^{M} w_i \cdot (2 \times \hat{d}_{n-i} - 1)\right)\right)$$

Based on Equation 3 and Equation 4, the amount to be changed of the threshold to demodulate the currently received symbol may be expressed as a single equation irrespective of a sign of the comparison value. Accordingly, a system complexity level may be decreased.

In an embodiment, the amount by which the threshold to demodulate the currently received symbol is changed may be approximately expressed by applying a second order Taylor series, or a higher order, to the exponential function based on the comparison value.

Figure 6:
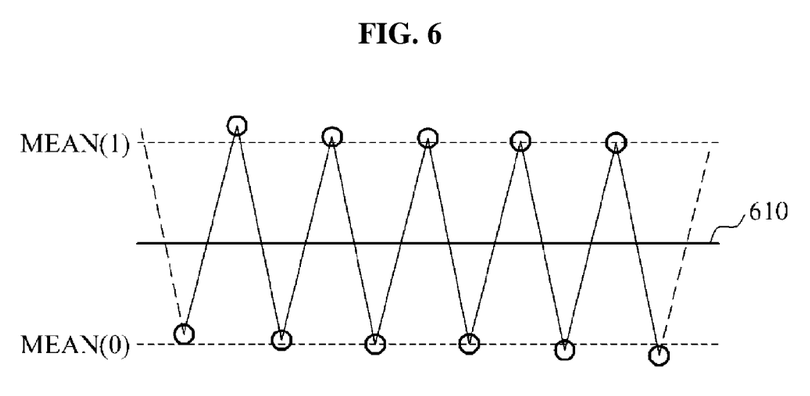
FIG. 6 illustrates an example of a fixed threshold in a method to adaptively set a threshold, in accordance with an embodiment.

FIG. 6 illustrates an example of a fixed threshold in a method to adaptively set a threshold, in accord with an embodiment.

Referring to FIG. 6, in the method to adaptively set a threshold according to an embodiment, a training symbol having a demodulation value of "0" and a training symbol having a demodulation value of "1" are alternately received during a predetermined training period. Because the training symbol having the demodulation value of "0" and the training symbol having the demodulation value of "1" are alternately received, a probability distribution of the training symbol having the demodulation value of "0" may be identical to a probability distribution of the training symbol having the demodulation value of "1". Accordingly, a fixed threshold 610 may be set to be an intermediate value between "0" and "1". However, depending on characteristics of a system, the probability distribution of the training symbol having the demodulation value of "0" may differ from the probability distribution of the training symbol having the demodulation value of "1". Thus, the fixed threshold 610 may be changed from the intermediate value between "0" and "1" to a value close to "0" or "1". Also, the fixed threshold 610 may be set to be another value depending on the characteristics of the system.

Figure 7:
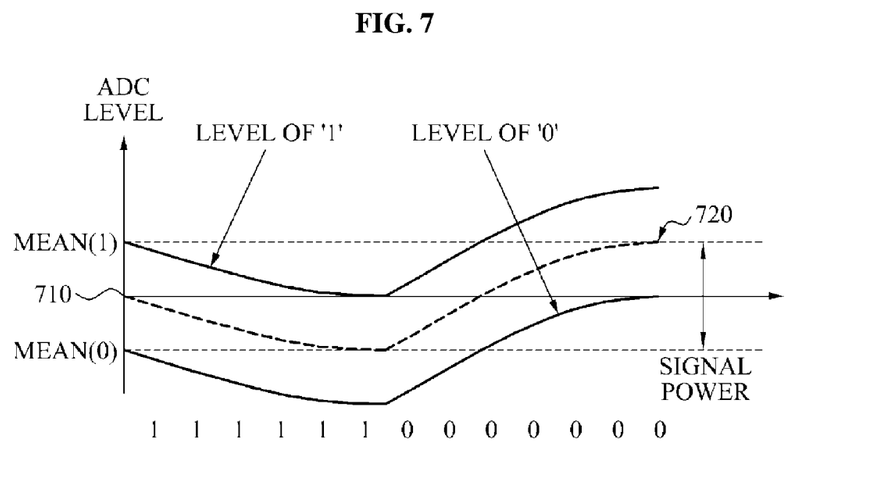
FIG. 7 illustrates an example of a threshold to demodulate a currently received symbol, in accordance with an embodiment.

FIG. 7 illustrates an example of a threshold to demodulate a currently received symbol.

Referring to FIG. 7, a fixed threshold 710 is set to be an intermediate value between "0" and "1" based on a predetermined training period. When a symbol having a demodulation value of "0" or a symbol having a demodulation value of "1" is continuously received, an output signal of ADC may not maintain an amplitude in the symbol and, due to a DC fluctuation effect, may tend to have an average value. Thus, when the symbol having the demodulation value of "1" is continuously received, the output signal of the ADC may have a tendency to decrease. When the symbol having the demodulation value of "0" is continuously received, the output signal of the ADC may have a tendency to increase. Accordingly, when a received symbol is demodulated using the fixed threshold 710, the demodulation value may not be accurately determined.

According to an example embodiment, a threshold 720 to demodulate a currently received symbol may be calculated using an exponential function based on a comparison value obtained by comparing a number of previously received symbols having the demodulation value of "0" to a number of previously received symbols having the demodulation value of "1". Accordingly, the threshold 720 to demodulate the currently received symbol is adaptively varied based on the comparison value. For example, when the symbol having the demodulation value of "1" is continuously received, the threshold 720 to demodulate the currently received symbol may decrease. When the symbol having the demodulation value of "0" is continuously received, the threshold 720 to demodulate the currently received symbol may increase. In this instance, a change in the output signal of the ADC resulting from the DC fluctuation effect may be applied. Thus, when the received symbol is demodulated using the threshold 720 to demodulate the currently received symbol, the demodulation value of the received symbol may be more accurately determined.

Figure 8:
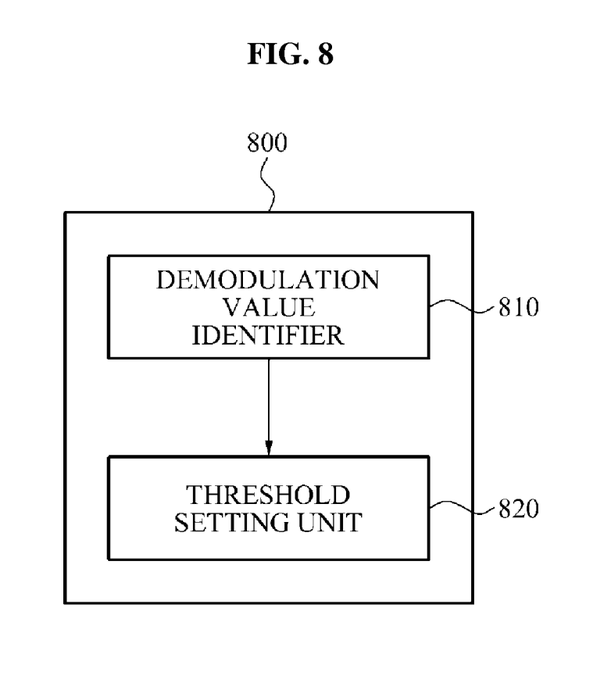
FIG. 8 illustrates an example of an apparatus to set a threshold, in accordance with an embodiment.

FIG. 8 illustrates an example of an apparatus 800 to set a threshold, in accord with an embodiment.

Referring to FIG. 8, a demodulation value identifier 810 identifies a demodulation value of a previously received symbol received during a predetermined symbol period.

A threshold setting unit 820 adaptively sets a threshold to demodulate a currently received symbol based on the demodulation value of the previously received symbol.

The apparatus 800 to set a threshold according to an example embodiment may further include a buffer storing the previously received symbol and the currently received symbol. The previously received symbol and the currently received symbol stored in the buffer are provided to the demodulation value identifier 810 and the threshold setting unit 820.

Descriptions provided with reference to FIGS. 1 through 7 may be identically applied to the apparatus 800 to set a threshold according to an example embodiment illustrated in FIG. 8 and thus, repeated descriptions will be omitted for increased clarity and conciseness.

The methods described above may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In accordance with an illustrative example, a computer program embodied on a non-transitory computer-readable medium may also be provided, encoding instructions to perform at least the method described in FIG. 5.

The unit and apparatuses described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method, comprising:
identifying a demodulation value of a previously received symbol received during a predetermined symbol period; and
adaptively setting a threshold to demodulate a currently received symbol based on the demodulation value of the previously received symbol,
wherein the adaptively setting comprise adaptively setting the threshold based on a number of at least one of a first logic value and a second logic value of the previously received symbol.

2. The method of claim 1, wherein the identifying comprises:
obtaining a comparison value by comparing a number of previously received symbols having a demodulation value of "0" and a number of currently received symbols having a demodulation value of "1".

3. The method of claim 2, wherein the obtaining comprises:
setting a weighted value based on a distance between the currently received symbol and the previously received symbol; and
comparing the number of previously received symbols having the demodulation value of "0" and the number of currently received symbols having the demodulation value of "1" using the weighted value.

4. The method of claim 2, wherein the adaptively setting comprises:
determining, based on the comparison value, an amount by which the threshold for demodulating the currently received symbol is to be changed.

5. The method of claim 4, wherein the identifying comprises:
calculating, using an exponential function based on the comparison value, the amount by which the threshold to demodulate the currently received symbol is to be changed.

6. The method of claim 5, wherein the calculating comprises:
calculating, by applying a Taylor series to the exponential function based on the comparison value, the amount by which the threshold to demodulate the currently received symbol is to be changed.

7. The method of claim 1, further comprising:
alternately receiving a training symbol having a demodulation value of "0" and a training symbol having a demodulation value of "1" during a predetermined training period.

8. The method of claim 7, wherein the adaptively setting comprises:
setting a fixed threshold using the training symbol having the demodulation value of "0" and the training symbol having the demodulation value of "1"; and
setting the fixed threshold to be an initial value of the threshold for demodulating the currently received symbol.

9. The method of claim 7, wherein the adaptively setting comprises:
identifying an amplitude difference between the training symbol having the demodulation value of "0" and the training symbol having the demodulation value of "1"; and
setting, using the amplitude difference, a range in which the threshold to demodulate the currently received symbol is to be changed.

10. An apparatus, comprising:
a demodulation value identifier configured to identify a demodulation value of a previously received symbol received during a predetermined symbol period; and
a threshold setting unit configured to adaptively set a threshold to demodulate a currently received symbol based on the demodulation value of the previously received symbol,
wherein the threshold setting unit adaptively sets the threshold based on a number of at least one of a first logic value and a second logic value of the previously received symbol.

11. The apparatus of claim 10, further comprising:
a buffer configured to store the previously received symbol and the currently received symbol,
wherein the demodulation value identifier and the threshold setting unit receive the previously received symbol and the currently received symbol.

12. The apparatus of claim 10, wherein the demodulation value identifier comprises:
a comparison value obtainer configured to obtain a comparison value by comparing a number of the previously received symbols having a demodulation value of "0" and a number of the currently received symbols having a demodulation value of "1".

13. The apparatus of claim 12, wherein the threshold setting unit comprises:
an amount determiner configured to determine, based on the comparison value, an amount by which the threshold to demodulate the currently received symbol is to be changed.

14. The apparatus of claim 10, wherein the comparison value obtainer comprises:
a weighted value setting unit configured to set a weighted value based on a distance between the currently received symbol and the previously received symbol; and
a symbol number comparator configured to compare the number of previously received symbols having the demodulation value of "0" and the number of currently received symbols having the demodulation value of "1" using the weighted value.

15. The apparatus of claim 10, further comprising:
a training symbol receiver configured to alternately receive a training symbol having a demodulation value of "0" and a training symbol having a demodulation value of "1" during a predetermined training period.

16. The apparatus of claim 15, wherein the threshold setting unit comprises:
a fixed threshold setting unit configured to set a fixed threshold using the training symbol having the demodulation value of "0" and the training symbol having the demodulation value of "1"; and
an initial value setting unit configured to set the fixed threshold to be an initial value of the threshold to demodulate the currently received symbol.

17. The apparatus of claim 15, wherein the threshold setting unit comprises:
an amplitude difference identifier configured to identify an amplitude difference between the training symbol having the demodulation value of "0" and the training symbol having the demodulation value of "1"; and
a range setting unit configured to set, using the amplitude difference, a range in which the threshold to demodulate the currently received symbol is to be changed.

18. A method, comprising:
calculating, prior to demodulating a currently received signal, an amount of threshold to be changed based on at least one of a demodulation value of "0" and a demodulation value of "1" among demodulation signals occurring in a predetermined period; and
demodulating the currently received signal based on the calculated amount of threshold to be changed,
wherein the calculating comprise calculating the amount of threshold based on a number of at least one of the demodulation value of "0" and the demodulation value of "1".

19. The method of claim 18, wherein the calculating comprises:
obtaining a comparison value by comparing a number of previously received signals having the demodulation value of "0" and a number of currently received signals having the demodulation value of "1".

20. The method of claim 19, wherein the calculating further comprises:
calculating, using an exponential function based on the comparison value, the amount by which the threshold to demodulate a currently received signal is to be changed.

21. The method of claim 20, wherein the calculating, using the exponential function, further comprises:
calculating, by applying a Taylor series to the exponential function based on the comparison value, the amount by which the threshold to demodulate the currently received signal is to be changed.

* * * * *